United States Patent [19]

Harker et al.

[11] E Patent Number: Re. 32,932

[45] Reissued Date of Patent: May 30, 1989

[54] COLD HEARTH REFINING

[75] Inventors: Howard R. Harker, Malvern; Charles H. Entrekin, Coatesville, both of Pa.

[73] Assignee: A Johnson Metals Corporation, Lionville, Pa.

[21] Appl. No.: 217,610

[22] Filed: Jul. 1, 1988

Related U.S. Patent Documents

Reissue of:

[64] Patent No.: 4,750,542
Issued: Jun. 14, 1988
Appl. No.: 102,276
Filed: Sep. 28, 1987

U.S. Applications:

[63] Continuation of Ser. No. 22,430, Mar. 6, 1987, abandoned.

[51] Int. Cl.[4] ..... B22D 27/02
[52] U.S. Cl. ..... 164/506; 164/512
[58] Field of Search ..... 164/469, 494, 495, 506, 164/508, 512, 514

[56] References Cited

U.S. PATENT DOCUMENTS 3,342,250 9/1967 Treppschuh et al. ..... 164/494 X
4,027,722 6/1977 Hunt ..... 164/469

*Primary Examiner*—Kuang Y. Lin
*Attorney, Agent, or Firm*—Brumbaugh, Graves, Donohue & Raymond

[57] ABSTRACT

In the particular embodiment of an electron beam cold hearth refining arrangement described in the specification, two separate hearth segments are disposed at right angles to each other and raw material is supplied to a melt area at the end of the first hearth segment remote from the second hearth segment. Molten material is poured from the opposite end of the first hearth segment into the adjacent end of the second hearth segment and refined molten material is poured into a mold from the opposite end of the second hearth segment. To prevent spattering of unrefined material into the mold or the adjacent refining area of the second hearth segment a baffle is positioned in the angle between the two mold segments.

10 Claims, 1 Drawing Sheet

COLD HEARTH REFINING

Matter enclosed in heavy brackets [ ] appears in the original patent but forms no part of this reissue specification; matter printed in italics indicates the additions made by reissue.

This application is a continuation of application Ser. No. 022,430, filed on Mar. 6, 1987, now abandoned.

BACKGROUND OF THE INVENTION

This invention relates to [electron beam] cold hearth refining of metals such as titanium alloys which must be completely free of unrefined, inclusions and, more particularly, to a new and improved [electron beam] cold hearth refining furnace which is especially adapted to prevent contamination of refined metal.

In certain applications wherein metals such as titanium alloys which have been refined by [electron beam] cold hearth refining are used in aircraft engine parts, the presence of even the tiniest amounts of unrefined inclusions in the refined ingot is severly detrimental. Since such inclusions may, for example, result in fracture and disintegration of aircraft engine parts rotating at very high speed they should be completely avoided.

In conventional [electron beam] cold hearth refining of metals such as titanium alloys, a water cooled hearth is supplied with lumps or pieces of titanium sponge or machine turnings of titanium alloy consisting of scrap from the manufacture of titanium alloy parts. This material is introduced by gravity feed at one end of a cooled elongated hearth in [an electron beam] *a* furnace in which the material is melted and refined by electron beam *or plasma* impingement. The refined molten material is poured from the opposite end of the hearth into a cylindrical mold where it forms a vertically disposed cylindrical ingot that is withdrawn downwardly within the mold as it solidifies.

In conventional [electron beam] cold hearth furnaces used for refining of titanium alloy or the like, the raw material often includes vaporizable contaminants such as chlorine in titanium sponge and oil or moisture in machine turnings. As such materials are introduced into the melt area of the hearth and are heated by the molten metal and by an electron beam, *for example,* the vaporizable contaminants frequently produce relatively violent eruptions in the molten metal being refined. Such eruptions have been found to cause both molten and unmelted material from the melt area to be spattered toward other areas of the electron beam furnace including the casting area where the refined ingot is being molded. As a result, it is possible that unrefined metal containing undesirable inclusions such as titanium nitrides or tungsten carbides, for example, is introduced into the mold and thereby incorporated into the cast ingot and into any final product produced from the ingot, such as a jet engine compressor disc, for example.

Heretofore the provision of a vertical shield over the molten material at the end of the hearth adjacent to the casting area has been proposed in order to block such spattering of material into the mold. With such arrangements, however, unmelted material spattered by eruptions and prevented by the shield from entering the casting area directly can be deflected downwardly from the shield into the molten material at the point where it passes from the hearth into the mold. Furthermore, vaporized material and spattered molten material may accumulate and solidify on the shield and occasionally portions of such solid material containing contaminating inclusions may drop from the shield into the refined molten material as it passes from the hearth into the mold.

Accordingly, it is an object of the present invention to provide a new and improved [electron beam] cold hearth refining arrangement which overcomes the abovementioned disadvantages of the prior art.

Another object of the invention is to provide a new and improved [electron beam] cold hearth refining furnace which provides greater assurance that refined metal will be free of undesirable inclusions.

SUMMARY OF THE INVENTION

These and other objects of the invention are attained by providing an elongated hearth arrangement having hearth segments which extend at an angle to each other, a supply device for introducing raw material to a melt area at one end of one of the hearth segments, a mold for receiving refined material from the opposite end of another segment, and a shield disposed in the angle between the hearth segments at a location such that a straight line extending between the melt area and the mold intersects the shield at a position laterally spaced from both of the hearth segments. In a preferred arrangement, the two hearth segments are separate hearths disposed at right angles to each other at different levels so that refined molten metal from the first hearth is poured into the adjacent end of the second hearth.

BRIEF DESCRIPTION OF THE DRAWINGS

Further objects and advantages of the invention will be apparent from a reading of the following description in conjunction with the accompanying drawings in which.

DESCRIPTION OF THE PREFERRED EMBODIMENT

Figure 1:
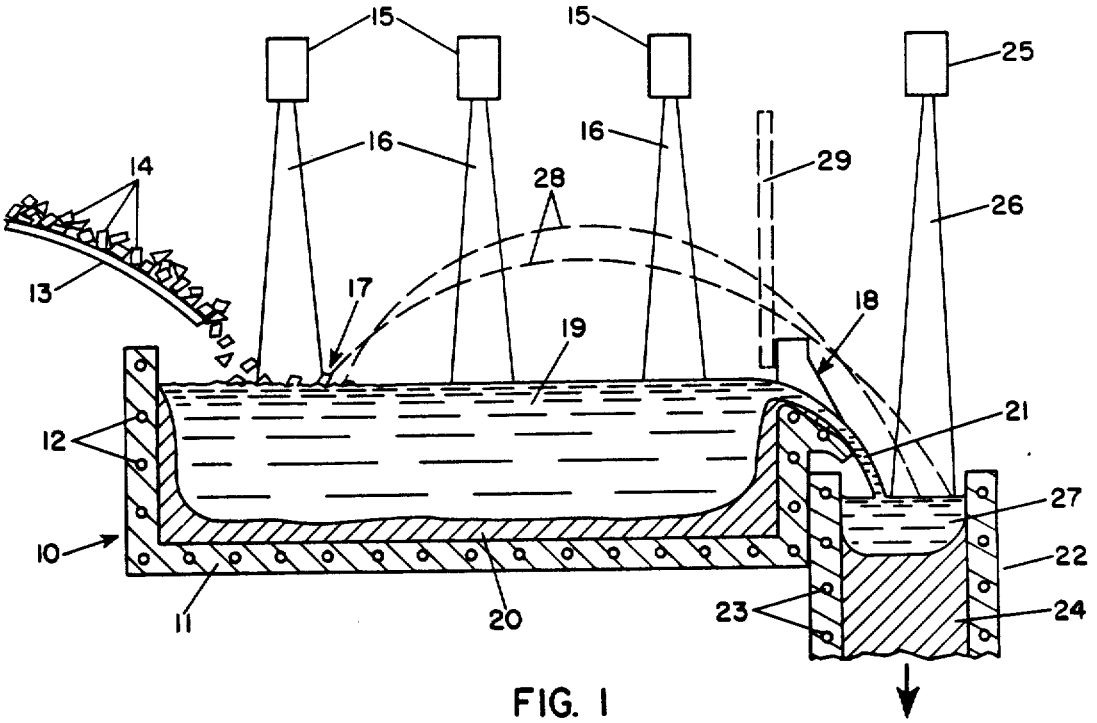
FIG. 1 (PRIOR ART)
FIG. 1 is a schematic view in longitudinal section illustrating a representative conventional electron beam cold hearth refining arrangement.

In the conventional cold hearth electron beam refining arrangement shown in FIG. 1, a hearth 10 comprises a hearth bed 11 containing cooling pipes 12 through which water or another cooling liquid may be circulated. At the inlet end of the hearth, a chute 13 directs pieces 14 of the raw material to be refined, such as titanium sponge or titanium alloy machine turnings, into the hearth and a series of electron beam guns 15 disposed above the hearth produces controllable beams of electrons 16 which can be directed to desired areas of the hearth to heat the material to be refined in a desired manner. One of the beams 16 is concentrated on the raw material 14 at the melt area 17 of the hearth so as to melt the raw material, and other electron beams 16 are controlled so as to refine the molten metal during its passage from the melt area 17 to a pouring lip 18 at the other end of the hearth. *Alternatively, other energy sources, such as plasma torches, may be used in place of electron beam guns.*

As a result, the raw material introduced into the hearth forms a molten pool 19 which flows from the melt area 17 to the lip 18. Because the hearth bed 11 is cooled by liquid flowing through the pipes 12, a solid skull 20 of the molten material 19 in the pool forms on the inner surface of the hearth bed, protecting it from degradation by the molten material.

As the molten material 19 flows through the hearth, it is completely melted and refined, producing a stream 21 of molten refined material which pours from the pouring lip 18 into a vertical mold 22 containing cooling pipes 23. The molten metal then cools in the mold 22, forming an ingot 24 which is gradually moved downwardly within the mold in a conventional manner as indicated by the arrow. Another electron beam gun 25 directs a beam of electrons 26 in a controlled manner toward the surface of the molten material 27 within the mold so as to control the cooling and solidification of that material into the ingot 21 in a desired manner. The entire arrangement is, of course, contained within a sealed enclosure (not shown) and maintained at a high vacuum in the conventional manner.

As the raw material 14 is introduced into the melt area of the hearth, it frequently carries with it certain contaminants which are volatile at the temperature of the molten material 19 and which are therefore removed during the refining process. For example, chlorine may be contained within titanium sponge particles and liquids such as oil and water may be carried by titanium alloy turnings as they are poured from the chute 13 into the melt area 17. Frequently, the introduction of such volatile materials into the molten material 19 causes rapid vaporization of the volatile material at or below the surface of the molten material, producing eruptions which spatter both molten and unmelted material in all directions.

In conventional hearth arrangements such eruptions may spatter unrefined material directly from the melt area 17 of the hearth into the mold 22 as indicated by the dotted line paths 28 in FIG. 1. Although the electron beam gun 25 directs a beam of electrons 26 at the surface of the molten material 27 in the mold, that material is generally at a lower temperature than the material in the hearth and the electron beam 26 will normally not be sufficient to refine any unrefined material within the mold. As a result, the spattered unrefined metal, containing inclusions such as titanium nitrides or tungsten carbides, may be incorporated into the ingot 20224 4, contaminating the final product made from that ingot with detrimental results to that product.

In certain conventional [electron beam] cold hearth furnaces, a shield may be placed above the outlet end of the hearth, as indicated by the dotted outline 29 in FIG. 1, to block material spattered from the melt area from passing directly into the mold 22. With such arrangements, however, unrefined material spattered from the melt area 17 toward the mold which strikes the shield 29 is frequently deflected downwardly to the surface of the molten material 19 as it is being poured into the mold so that it is carried directly into the mold with the molten material. Moreover, vaporized material and spattered molten material solidifies on the surface of the shield and portions of such solidified material may be dislodged so that they fall directly into the molten material being poured with the same detrimental result.

Figure 2:
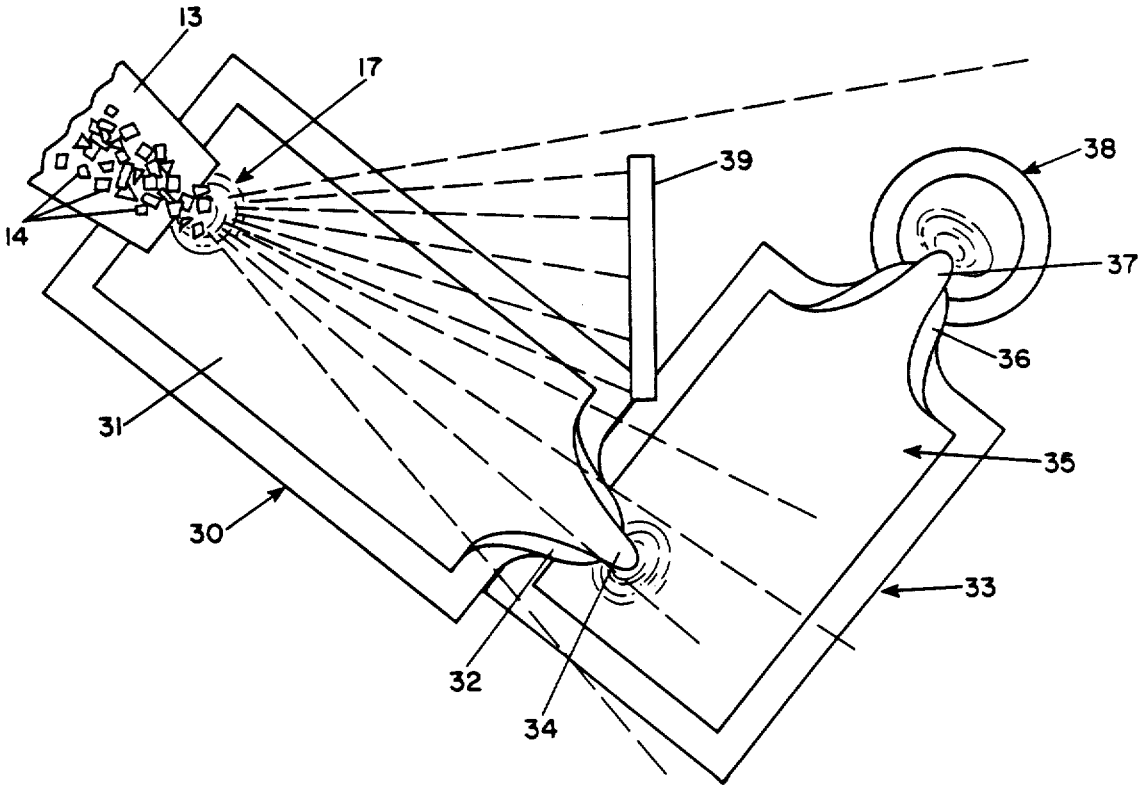
FIG. 2 is a schematic plan view illustrating a typical electron beam cold hearth refining arrangement in accordance with the present invention.

In accordance with the present invention, the possibility of introducing such unrefined material into a mold is eliminated by providing a segmented hearth in the manner shown in FIG. 2. In this arrangement, a first hearth segment 30 is in the form of an elongated hearth having an inlet end at which raw material, such as titanium sponge or titanium alloy turnings 14, is introduced from a chute 13 into the melt area 17. Electron beam guns, similar to the guns 15 shown in FIG. 1 but not shown in FIG. 2, are arranged above the hearth segment 30 to melt the raw material in the melt area 17 and to refine the molten material 31 as it passes toward a pouring lip 32 at the outlet end of the hearth segment 30. A second elongated hearth segment 33, positioned at a lower level than the hearth segment 30 and at right angles to the segment 30 receives molten material 34 from the pouring lip 32. One or more additional electron guns, similar to the guns 15 of FIG. 1 but not illustrated in FIG. 2, direct electron beams toward the surface of the molten material in a refining area 35 of this hearth segment to complete the refining of the material as it flows through the hearth segment. At its outlet end, the hearth segment 33 has a pouring lip 36 through which refined molten metal 37 is poured into a mold 38 to produce a refined ingot in the same manner described above with respect to FIG. 1. The mold 38 as illustrated in FIG. 2 has a circular cross section but it may, instead, have any other desired cross-sectional configuration, such as rectangular, for example.

To prevent introduction of unrefined material into the mold 38 in accordance with the invention, a solid shield 39 is mounted in the angle between the first and second hearth segments 30 and 33 in such manner that a direct line between the melt area 17 at the inlet to the hearth segment 30 and either the refining area 35 of the second hearth segment or the mold 38 intersects the shield 39. In addition, as shown in FIG. 2, the shield 39 is laterally displaced from the hearth segments so that molten material spattered against it or vaporized or spattered material which has solidified on its surface will not fall into the molten material in either the first hearth segment 30 or the second hearth segment 33. Although only two hearth segments are shown in FIG. 2, any number of hearth segments may, of course, be used as long as a shielding arrangement is provided to prevent material spattered from the melt area from reaching the mold.

With this arrangement, metals such as titanium alloy can be refined in [an electron beam] *a* cold hearth furnace without concern over possible inclusions which might be spattered into the mold at the end of the hearth by the introduction of materials containing vaporizable contaminants at the melt area of the hearth. Furthermore, when two or more hearth segments at different levels are used, as in the embodiment shown in FIG. 2, two separate hearth skulls are formed so that thermal expansion and contraction of the skulls can occur in each hearth segment independently of the conditions in the other hearth segment. As a result, different refining conditions can be used in the hearth segments and improved stirring of the material being refined is provided by the cascading of molten material from one segment to the other so that improved refining of the material can be obtained.

Although the invention has been described herein with reference to a specific embodiment, many modifications and variations therein will readily occur to those skilled in the art. Accordingly, all such variations and modifications are included within the intended scope of the invention as defined by the following claims.

We claim:

1. An electron beam refining furnace comprising hearth means including first and second elongated hearth segments disposed at an angle with respect to each other, a mold to receive molten material after passage through the first and second hearth segments, supply means for introducing material to be refined to a melting area adjacent to one end of the first hearth segment and horizontally spaced from the mold, connecting means providing for flow of molten material between the opposite end of the first hearth segment and one end of the second hearth segment, means for transferring refined material from the opposite end of the second hearth segment into the mold, and shield means disposed between the melting area of the first hearth segment and the mold so that a vertical plane extending between the melting area of the first hearth segment and the mold intersects the shield means at a location laterally spaced from a vertical plane containing the melting area and the path of molten material between the hearth segments, the shield means being oriented at an angle to the horizontal to intercept molten material spattered in a generally horizontal direction from the melting area toward the mold.

2. An electron beam refining furnace according to claim 1 wherein the first hearth segment is at a higher level than the second hearth segment and the connecting means comprises a pouring lip at the end of the first hearth segment adjacent to the second hearth segment.

3. An electron beam refining furnace according to claim 1 wherein the second hearth segment includes a refining area and wherein the shield means is disposed so that a straight line extending between the melt area of the first hearth segment and the refining area of the second hearth segment intersects the shield means at a location laterally spaced from the first and second hearth segments.

4. An electron beam refining furnace according to claim 1 wherein the first and second elongated hearth segments are disposed substantially at right angles to each other, the melt area of the first hearth segment is at the end of the segment remote from the second hearth segment, the mold is disposed adjacent to the end of the second hearth segment remote from the first hearth segment and the shield means is disposed in the corner formed between the first and second hearth segments.

5. An electron beam refining furnace according to claim 1 wherein the first and second hearth segments are arranged to subject the molten material passing through them to different refining conditions.

*6. A cold hearth refining furnace comprising hearth means including first and second elongated hearth segments disposed at an angle with respect to each other, a mold to receive molten material after passage through the first and second hearth segments, supply means for introducing material to be refined to a melting area adjacent to one end of the first hearth segment and horizontally spaced from the mold, connecting means providing for flow of molten material between the opposite end of the first hearth segment and one end of the second hearth segment, means for transferring refined material from the opposite end of the second hearth segment into the mold, and shield means disposed between the melting area of the first hearth segment and the mold so that a vertical plane extending between the melting area of the first hearth segment and the mold intersects the shield means at a location laterally spaced from a vertical plane containing the melting area and the path of molten material between the hearth segments, the shield means being oriented at an angle to the horizontal to intercept molten material spattered in a generally horizontal direction from the melting area toward the mold.*

*7. A cold hearth refining furnace according to claim 6 wherein the first hearth segment is at a higher level than the second hearth segment and the connecting means comprises a pouring lip at the end of the first hearth segment adjacent to the second hearth segment.*

*8. A cold hearth refining furnace according to claim 6 wherein the second hearth segment includes a refining area and wherein the shield means is disposed so that a straight line extending between the melt area of the first hearth segment and the refining area of the second hearth segment intersects the shield means at a location laterally spaced from the first and second hearth segments.*

*9. A cold hearth refining furnace according to claim 6 wherein the first and second elongated hearth segments are disposed substantially at right angles to each other, the melt area of the first hearth segment is at the end of the segment remote from the second hearth segment, the mold is disposed adjacent to the end of the second hearth segment remote from the first hearth segment and the shield means is disposed in the corner formed between the first and second hearth segments.*

*10. A cold hearth refining furnace according to claim 6 wherein the first and second hearth segments are arranged to subject the molten material passing through them to different refining conditions.*

* * * * *